United States Patent Office 3,058,985
Patented Oct. 16, 1962

3,058,985
THREO-PHENYL-(BENZYLTHIO)-(2-PIPERIDYL)-METHANE
Robert Michel Jacob, Ablon-sur-Seine, and Nicole Marie Preau, née Joseph, Paris, France, assignors to Societe des Usines Chimiques Rhone-Poulenc, Paris, France, a corporation of France
No Drawing. Filed July 1, 1960, Ser. No. 40,199
Claims priority, application Great Britain July 14, 1959
1 Claim. (Cl. 260—293.4)

This invention provides new therapeutically active thioethers of threo-2-piperidylphenylmethane thiols, a process for their preparation and pharmaceutical compositions containing them.

According to the present invention, there are provided new thioethers of threo-2-piperidylphenylmethane thiols of the general planar formula:

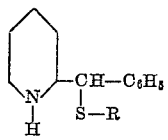

(wherein R represents an alkyl group containing up to 6 carbon atoms such as methyl, ethyl, n-propyl, isopropyl, n-butyl, isobutyl, s-butyl, amyl or hexyl, or an aralkyl group such as benzyl or phenethyl) including the optically active isomers and corresponding racemates, and acid addition salts thereof.

According to a feature of the invention, the aforesaid thioethers are prepared by reacting a compound of the general planar formula:

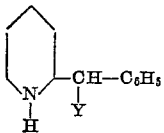

as a racemate or optically active isomer, or an acid addition salt thereof, with a thiol R—SH or an alkali metal derivative thereof (wherein Y represents a halogen atom, preferably chlorine, and R is as hereinbefore defined). The reaction is preferably effected in an inert organic solvent such as ethanol. Racemic thioethers thus obtained may optionally be separated into the individual optically active isomers by direct resolution.

The new thioethers of threo-2-piperidylphenylmethane thiols conforming to general Formula I and acid addition salts thereof (where R is an alkyl group containing up to 3 carbon atoms) possess central nervous stimulant properties, which are observable in particular in the animal (rat) by a motor hyperactivity and an increase of psychic aptitude in carrying out certain tests. The individual optically active isomers possess qualitatively properties analogous to those of the racemates: they differ quantitatively, however, by the intensity of their activity which, combined with notable differences in their secondary effects, renders their use for therapeutic purposes probably more advantageous. It is emphasized that with these thioethers the period of excitation resulting from administration to animals is not followed by a period of depression as is the case with certain other stimulants such as, for example, amphetamine. The thioethers of general Formula I where R is an alkyl group containing up to three carbon atoms are, therefore, useful in the treatment of states of fatigue and depression. Compounds of importance are those in which R represents an ethyl group.

The new thioethers of threo-2-piperidylphenylmethane thiols conforming to general Formula I and acid addition salts thereof where R is an alkyl group containing 3 to 6 carbon atoms or an aralkyl group possess very useful local anaesthetic properties.

For therapeutic purposes, the bases of general Formula I are preferably employed in the form of acid addition salts containing pharmaceutically acceptable anions so that the beneficial physiological properties inherent in the parent compound are not vitiated by side-effects ascribable to those anions; in other words, only non-toxic salts are contemplated. Suitable acid addition salts include hydrohalides (for example hydrochlorides), phosphates, nitrates, sulphates, maleates, fumarates, citrates, tartrates, methane sulphonates and ethane disulphonates. These salts may be made from the bases of general Formula I by the methods heretofore used in the art for making acid addition salts. For example, the acid addition salts may be made by mixing the required base with an equivalent quantity of a non-toxic acid in a solvent and isolating the resultant salt by filtration after, if necessary, evaporation of part or all of the solvent. They may be purified by crystallisation or by any other method commonly used in the art.

The following examples illustrate the invention.

*Example I*

To an ethanolic solution of sodium ethoxide prepared from sodium (23 g.) and ethanol (750 cc.), there are added in succession an ethanolic solution of ethanethiol (575 cc. containing 31 g. of the latter compound), potassium iodide (83 g.), and racemic phenyl(2-piperidyl)-methyl chloride hydrochloride (123 g.), and the mixture is boiled for 15 hours. It is then evaporated under reduced pressure, and the oily residue obtained is treated with distilled water (250 cc.) followed by ether (250 cc.).

The two phases obtained are separated and the aqueous phase is extracted with ether (3×100 cc.). The combined ethereal phases are washed with water (3×100 cc.), and then extracted with 2 N hydrochloric acid (250 cc. followed by 3×50 cc.).

The aqueous acid phase is washed with ether and then made distinctly alkaline with sodium hydroxide (120 cc., $d=1.33$) with cooling. The base thus obtained is extracted with ether (250 cc. followed by 3×100 cc.), and the ethereal extract is washed with water (3×100 cc.) and dried over potassium carbonate. After evaporation of the ether, there is obtained the crude base (103.2 g.) which is dissolved in ethyl acetate (300 cc.). The addition of a 15% solution (100 cc.) of hydrogen chloride in anhydrous ether causes precipitation of phenyl(ethylthio)-(2-piperidyl)methane hydrochloride in the racemic threo form. After filtration and washing with boiling ethyl acetate, this product (37.5 g.) is obtained with a melting point of about 178–180° C. (Kofler). After recrystallisation from butanone (600 cc.), 26.8 g. are obtained, M.P. 183–184° C. (Kofler). The picrate of this phenyl-(ethylthio)(2-piperidyl)methane melts at 180° C. (Kofler). By fractional crystallisation of picrates obtained from the mother-liquors from the precipitation of the crude hydrochloride, there is obtained phenyl(ethylthio)(2-piperidyl)methane picrate (31 g.) in the racemic threo form, M.P. 178–180° C. (Kofler).

*Example II*

Proceeding exactly as in Example I, but commencing with laevorotatory phenyl(2-piperidyl)methyl chloride hydrochloride (34.4 g.) of specific rotary power $[\alpha]_D^{20} = -95°$ (c.=1, chloroform, there is obtained a crude base (29 g.) which has a rotatory power $[\alpha]_D^{20} = -83°$ (c.=3, chloroform), which is dissolved in chloroform (50 cc.). The addition of a solution of hydrogen chloride (30 cc. of a solution of about 15%) in anhydrous ether causes precipitation of phenyl(ethylthio)-(2-piperidyl)methane hydrochloride (16.8 g.) in the laevorotatory threo form, M.P. 200° C., specific rotatory power $[\alpha]_D^{20} = -74°$ (c.=1, chloroform).

After repeated crystallisations from butanone, the product (6 g. is obtained with a melting point of 202° C. and specific rotatory power $[\alpha]_D^{20} = -144.5°$ (c.=1, chloroform).

*Example III*

Proceeding as in Example II but commencing with dextrorotatory phenyl(2-piperidyl)methyl chloride hydrochloride (27.3 g.) of specific rotatory power $[\alpha]_D^{20} = +94°$ (c.=1, chloroform) there is obtained phenyl(ethylthio)-(2-piperidyl)methane hydrochloride (3.3 g.) in the dextrorotatory threo form, M.P. 202° C. and specific rotatory power $[\alpha]_D^{20} = +144°$ (c.=1, chloroform).

*Example IV*

To an ethanolic solution of sodium ethoxide prepared from sodium (7.35 g.) and ethanol (300 cc.) there are added in succession butanethiol (14.4 g.), racemic phenyl-(2-piperidyl)methyl chloride hydrochloride (39.3 g.) and potassium iodide (26.6 g.) and the mixture is boiled for 16 hours with agitation. The ethanol is evaporated under reduced pressure and the residue obtained is then treated with water (200 cc.) and ether (200 cc.). The two phases obtained are separated and the aqueous phase is extracted with ether (3×50 cc.). The combined ethereal phases are then washed with water (3×50 cc.) and extracted with 2 N hydrochloric acid (90 cc. then 3×60 cc.). The aqueous acid phase is washed with ether (3×50 cc.) and then made alkaline with sodium hydroxide (d=1.33, 70 cc.) with cooling. The base thus liberated is extracted with ether (100 cc. followed by 3×50 cc.) and the ethereal extracts are washed with water (3×50 cc.) and dried over potassium carbonate. After evaporation of the ether, the crude base (35.5 g.) obtained is distilled under reduced pressure. There is thus obtained crude phenyl(butylthio)(2-piperidyl)methane (28.6 g.), B.P. 195° C. under a pressure of 1.5 mm. Hg.

By the addition of a hot solution of fumaric acid (7.3 g.) in ethanol (150 cc.) to a hot solution of the base (17 g.) in ethanol (40 cc.), there is obtained phenyl-(butylthio)(2-piperidyl)methane fumarate (10.8 g.) of racemic threo form, M.P. 196° C. (Kofler). After recrystallisation from isopropanol it melts at 198° C.

The corresponding picrate and hydrochloride melt at 138–139° C. and 154° C. respectively.

*Example V*

Proceeding as in Example IV but commencing with benzylthiol there is obtained a crude base (43.5 g.) which is dissolved in hot isopropanol (100 cc.). After addition of a solution (37 cc.) of about 16% hydrochloric acid in ether, phenyl(benzylthio)(2-piperidyl)methane hydrochloride (28 g.) of racemic threo form, M.P. 178–180° C., precipitates.

The addition of ether (100 cc.) to the mother liquors of the first crop of hydrochloride (28 g.) causes precipitation of a second crop of hydrochloride (7 g.), M.P. 176° C.

The corresponding picrate melts at 172° C.

*Example VI*

Proceeding as in Example IV but commencing with isopropanethiol, there is obtained crude phenyl(isopropylthio)(2-piperidyl)methane (34.4 g.) which is converted directly into the hydrochloride. By crystallisation from butanone (100 cc.) there is obtained a hydrochloride (17 g.), M.P. 202° C. By recrystallisation from isopropanol (50 cc.) there is obtained pure phenyl(isopropylthio)(2-piperidyl)methane hydrochloride (13.3 g.) of racemic threo form, M.P. 222° C.

The corresponding picrate melts at 180° C.

The present invention includes within its scope pharmaceutical compositions which comprise one or more compounds of general formula I or their acid addition salts as aforesaid together with a significan amount of a pharmaceutical carrier. The invention includes especially such compositions made up for oral or parenteral administration.

Solid compositions for oral administration include compressed tablets, pills, dispersible powders, and granules. In such solid compositions one or more of the active compounds of the invention is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavouring and preserving agents.

The compositions according to the invention, for oral administration also include capsules of absorbable material such as gelatin containing one or more of the active substances of the invention with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. The compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other injectable medium immediately before use.

The percentage of active ingredient in the compositions of the invention may be varied, it being necessary that it should constitute a proportion such that a suitable dosage shall be obtained. Obviously several unit dosage forms may be administered at about the same time. In general, the preparations of the present invention should normally contain at least 0.02% by weight of active substance in the case of injectable solutions and at least 0.01% by weight of such substance in the case of oral preparations.

The following example illustrates pharmaceutical compositions according to the invention.

*Example VII*

A solution is prepared containing:

| | |
|---|---|
| Phenyl(butylthio)(2-piperidyl)methane hydrochloride _____g____ | 2.28 |
| Sodium chloride _____do____ | 0.60 |
| Distilled water, quantity sufficient to make __cc.____ | 100 |

Ampoules of 2 cc. are filled with the solution and sterilised by heating at 120° C. for 20 minutes.

We claim:

A member of the class consisting of racemic threo-phenyl(benzylthio)(2-piperidyl)methane and its non-toxic acid addition salts.

References Cited in the file of this patent

UNITED STATES PATENTS

| | | |
|---|---|---|
| 2,850,500 | Elpern _____ | Sept. 2, 1958 |
| 2,976,291 | Jacob et al. _____ | Mar. 21, 1961 |

OTHER REFERENCES

Conant: The Chemistry of Organic Compounds (Textbook); 1939, Revised edition, pages 264 and 265, The McMillan Co., New York, N.Y.

Fieser and Fieser: Organic Chemistry (Textbook), 3rd edition (1958); page 140; D. C. Heath and Co., Boston.